(12) United States Patent
Sakamoto et al.

(10) Patent No.: US 10,938,061 B2
(45) Date of Patent: Mar. 2, 2021

(54) SYSTEM AND METHOD FOR TREATING THE SURFACE OF SOLID ELECTROLYTES

(71) Applicant: The Regents of the University of Michigan, Ann Arbor, MI (US)

(72) Inventors: Jeffrey Sakamoto, Ann Arbor, MI (US); Travis Thompson, Ann Arbor, MI (US); Asma Sharafi, Ypsilanti, MI (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 32 days.

(21) Appl. No.: 15/943,312

(22) Filed: Apr. 2, 2018

(65) Prior Publication Data

US 2018/0301752 A1   Oct. 18, 2018

Related U.S. Application Data

(60) Provisional application No. 62/480,080, filed on Mar. 31, 2017.

(51) Int. Cl.
*H01M 4/00* (2006.01)
*H01M 10/0562* (2010.01)
(Continued)

(52) U.S. Cl.
CPC ...... *H01M 10/0562* (2013.01); *C01G 25/006* (2013.01); *H01M 4/5825* (2013.01); *H01M 10/0585* (2013.01); *C01P 2002/30* (2013.01); *C01P 2002/50* (2013.01); *C01P 2002/85* (2013.01); *C01P 2006/40* (2013.01); *H01M 4/382* (2013.01); *H01M 4/505* (2013.01);
(Continued)

(58) Field of Classification Search
CPC ......... H01M 10/0562; H01M 10/0585; H01M 4/382; H01M 4/5825; C01P 2006/40
See application file for complete search history.

(56) References Cited

U.S. PATENT DOCUMENTS

| 4,041,215 A | 8/1977 | Kormanyos et al. |
| 2009/0226790 A1 | 9/2009 | Kanamura et al. |

(Continued)

FOREIGN PATENT DOCUMENTS

| JP | 2013219017 A | 10/2013 |
| WO | 2015146315 A1 | 10/2015 |
| WO | 2016069749 A1 | 5/2016 |

OTHER PUBLICATIONS

Buschmann, et al., Structure and Dynamics of the Fast Lithium Ion Conductor "Li7La3Zr2O12", Phys. Chem. Chem. Phys., 2011, 13:19378-19392.
(Continued)

*Primary Examiner* — Cynthia H Kelly
*Assistant Examiner* — Monique M Wills
(74) *Attorney, Agent, or Firm* — Quarles & Brady LLP

(57) ABSTRACT

Disclosed are electrochemical devices, such as lithium battery electrodes, lithium ion conducting solid state electrolytes, and solid-state lithium metal batteries including these electrodes and solid state electrolytes. In one embodiment, a method for forming an electrochemical device is disclosed in which a precursor electrolyte is heated to remove at least a portion of a resistive surface region of the precursor electrolyte.

23 Claims, 7 Drawing Sheets

(51) Int. Cl.
| | |
|---|---|
| H01M 10/0585 | (2010.01) |
| H01M 4/58 | (2010.01) |
| C01G 25/00 | (2006.01) |
| H01M 10/0525 | (2010.01) |
| H01M 4/38 | (2006.01) |
| H01M 4/525 | (2010.01) |
| H01M 4/505 | (2010.01) |

(52) U.S. Cl.
CPC ........ *H01M 4/525* (2013.01); *H01M 10/0525* (2013.01); *H01M 2300/0071* (2013.01); *Y02E 60/10* (2013.01)

(56) References Cited

U.S. PATENT DOCUMENTS

| | | | |
|---|---|---|---|
| 2014/0079986 A1* | 3/2014 | Eo | C08F 283/01 429/188 |
| 2014/0287305 A1 | 9/2014 | Wachsman et al. | |
| 2015/0099188 A1 | 4/2015 | Holme et al. | |
| 2016/0049688 A1 | 2/2016 | Sung et al. | |
| 2016/0149260 A1 | 5/2016 | Badding et al. | |
| 2016/0293988 A1 | 10/2016 | Sakamoto et al. | |
| 2017/0092981 A1 | 3/2017 | Anandan et al. | |
| 2017/0331092 A1* | 11/2017 | Chen | H01M 2/168 |
| 2018/0205112 A1* | 7/2018 | Thomas-Alyea | H01M 10/056 |

OTHER PUBLICATIONS

Cheng, et al., Effect of Surface Microstructure on Electrochemical Performance of Garnet Solid Electrolytes, ACS Applied Materials & Interfaces, 2015, 7:2073-2081.

Janani, et al., Influence of Sintering Additives on Densification and Li+ Conductivity of Al Doped Li7La3Zr2O12 Lithium Garnet, RSC Advances, 2014, 4:51228-51238.

Ji, et al., Li-Ion Cell Operation at Low Temperatures, Journal of The Electrochemical Society, 2013, 160(4):A636-A649.

Kim, et al., Electrochemical Stability of Li6.5La3Zr1.5M0.5O12 (M=Nb or Ta) Against Metallic Lithium, Frontiers in Energy Research, 2016, vol. 4, Article 20, 7 pages.

Murugan, et al., Fast Lithium Ion Conduction in Garnet-Type Li7La3Zr2O12, Angew. Chem. Int. Ed., 2007, 46:7778-7781.

Ohta, et al., Electrochemical Performance of an All-Solid-State Lithium Ion Battery with Garnet-Type Oxide Electrolyte, Journal of Power Sources, 2012, 202:332-335.

Rangasamy, et al., The Role of Al and Li Concentration on the Formation of Cubic Garnet Solid Electrolyte of Nominal Composition Li7La3Zr2O12, Solid State Ionics, 2012, 206:28-32.

Sharafi, et al., Characterizing the Li—Li7La3Zr2O12 Interface Stability and Kinetics as a Function of Temperature and Current Density, Journal of Power Sources, 2016, 302:135-139.

Sharafi, et al., Impact of Air Exposure and Surface Chemistry on Li—Li7La3Zr2O12 Interfacial Resistance, Journal of Materials Chemistry A, 2017, 5(26):13475-13487.

Thangadurai, et al., Li6ALa2Ta2O12 (A=Sr, Ba): Novel Garnet-Like Oxides for Fast Lithium Ion Conduction, Advanced Functional Materials, 2005, 15(1):107-112.

Thangadurai, et al., Recent Progress in Solid Oxide and Lithium Ion Conducting Electrolytes Research, Ionics, 2006, 12:81-92.

Yu, et al., Elastic Properties of the Solid Electrolyte Li7La3Zr2O12 (LLZO), Chemistry of Materials, 2016, 28:197-206.

PCT International Search Report and Written Opinion, PCT/US2018/25685, dated Aug. 1, 2018, 11 pages.

Yamada et al., Sintering Mechanisms of High-Performance Garnet-type Solid Electrolyte Densified by Spark Plasma Sintering, Electrochimica Acta, 2016, 222:648-656.

\* cited by examiner

SYSTEM AND METHOD FOR TREATING THE SURFACE OF SOLID ELECTROLYTES

CROSS-REFERENCES TO RELATED APPLICATIONS

This application claims priority to U.S. Patent Application No. 62/480,080 filed Mar. 31, 2017.

STATEMENT REGARDING FEDERALLY SPONSORED RESEARCH

This invention was made with government support under grant number DE-EE-00006821 awarded by the U.S. Department of Energy. The government has certain rights in the invention.

FIELD OF THE INVENTION

This invention relates to electrochemical devices, such as lithium battery electrodes, lithium ion conducting solid state electrolytes, and solid-state lithium ion batteries including these electrodes and solid state electrolytes.

BACKGROUND

Current state of the art lithium ion batteries comprise two electrodes (an anode and a cathode), a separator material that keeps the electrodes from touching but allows Li+ ions through, and an electrolyte (which is an organic liquid with lithium salts). During charge and discharge, Li+ ions are exchanged between the electrodes.

State-of-the-art Li-ion technology is currently used in low volume production plug-in hybrid and niche high performance vehicles; however, widespread adoption of electrified powertrains requires 25% lower cost, four times higher performance, and safer batteries without the possibility of fire. Thus, future energy storage demands safer, cheaper and higher performance means of energy storage.

One strategy is to develop solid state batteries, where the liquid electrolyte is replaced with a solid material that is conductive to Li+ ions and can offer 3-4 times the energy density while reducing the battery pack cost by about 20%. Despite these attractive features, the fabrication and testing of solid state batteries for bulk scale applications, such as electric vehicles, has not been demonstrated.

Currently, the liquid electrolyte used in SOA Li-ion batteries is not compatible with advanced battery concepts, such as the use of a lithium metal anode or high voltage cathodes. Furthermore, the liquid utilized in SOA Li-ion batteries is flammable and susceptible to combustion upon thermal runaway. The use of a solid electrolyte to replace the liquid used in the SOA enables advanced cell chemistries while simultaneously eliminating the risk of combustion. Several solid-electrolytes have been identified including nitrogen doped lithium phosphate (LiPON) or sulfide based glasses, and companies have been formed to commercialize these types of technologies. While progress has been made towards the performance of cells of these types, large scale manufacturing has not been demonstrated since LiPON must be vapor deposited and sulfide glasses form toxic $H_2S$ upon exposure to ambient air. Thus, special manufacturing techniques are required for those systems.

Super conducting oxides (SCO) have also been proposed for use in a solid state electrolyte. Although several oxide electrolytes are reported in the literature, selection of a particular material is not trivial since several criteria must be simultaneously satisfied. The following metrics were identified on a combination of the SOA Li-ion battery technology baseline: (1) conductivity >0.2 mS/cm, comparable to SOA Li-ion battery technology, (2) negligible electronic conductivity, (3) electrochemical stability against high voltage cathodes and lithium metal anodes, (4) high temperature stability, (5) reasonable stability in ambient air and moisture, and (6) ability to be manufactured at a thicknesses of <50 microns. Since then, it has been shown that lithium lanthanum zirconium oxide (LLZO) can meet all of the criteria necessary for a solid-electrolyte outlined above.

Power performance and charge time are metrics that are of critical concern for fast-charging automotive, medical hand tools, and consumer electronic applications. Of critical interest for automotive fast-charging is the ability of the solid-electrolyte to support high current densities without failure. The current density at which failure is observed, known as the critical current density (CCD), must be 1-10 $mA/cm^2$ which is not trivial. Higher current densities directly relate to better power performance and faster charging times.

What is needed therefore are methods to raise the critical current density for solid-state batteries in automotive applications.

SUMMARY OF THE INVENTION

The present disclosure provides methods for forming and treating an electrochemical device to lower the area specific-resistance (ASR) of the interfacial impedance between a solid state electrolyte material and an anode in an electrochemical device.

In one aspect, the present disclosure provides a method for forming an electrochemical device. The method can comprise: (a) providing a precursor electrolyte having a resistive surface region; (b) heating the precursor electrolyte to remove at least a portion of the resistive surface region thereby forming a solid state electrolyte; and (c) placing the solid state electrolyte in contact with an electrode.

In the method, the precursor electrolyte can comprise a ceramic material having a formula of $Li_wA_xM_2Re_{3-y}O_z$
wherein w is 5-7.5,
wherein A is selected from B, Al, Ga, In, Zn, Cd, Y, Sc, Mg, Ca, Sr, Ba, and any combination thereof,
wherein x is 0-2,
wherein M is selected from Zr, Hf, Nb, Ta, Mo, W, Sn, Ge, Si, Sb, Se, Te, and any combination thereof,
wherein Re is selected from lanthanide elements, actinide elements, and any combination thereof,
wherein y is 0.01-0.75,
wherein z is 10.875-13.125, and
wherein the material has a garnet-type or garnet-like crystal structure.

In the method, the precursor electrolyte can comprise a material having any combination oxide or phosphate materials with a garnet, perovskite, NaSICON, or LiSICON phase.

In the method, the resistive surface region can comprise LiOH. In the method, the resistive surface region can comprise $Li_2CO_3$.

In the method, step (b) can further comprise heating at a temperature between 180° C. to 1000° C., or at a temperature between 350° C. and 650° C. The resulting interfacial resistance between the electrode and the solid state electrolyte can be less than 500 ohm $cm^2$, or less than 450 ohm $cm^2$, or less than 400 ohm $cm^2$, or less than 350 ohm $cm^2$, or less than 300 ohm $cm^2$, or less than 250 ohm $cm^2$, or less than 200 ohm cm$^2$, or less than 150 ohm cm$^2$, or less than 100 ohm cm$^2$, or less than 75 ohm cm$^2$, or less than 50 ohm cm$^2$, or less than 25 ohm cm$^2$, or less than 10 ohm cm$^2$. The resulting interfacial resistance between the electrode and the solid state electrolyte can be less than 30 ohm cm$^2$. In the method, step (b) can further comprise heating the precursor electrolyte under an inert gas atmosphere. In the method, step (b) can further comprise heating the precursor electrolyte in the presence of an anhydrous solvent. In the method, step (c) can occur within 1 second to 90 minutes after step (b).

In the method, the electrode can comprise an anode. The anode can consist essentially of one of lithium, magnesium, sodium, or zinc metal.

In the method, step (c) can further comprise depositing an interfacial layer on the solid state electrolyte. The interfacial layer can comprise a blocking metal, a semi-blocking metal, a non-blocking metal, or mixtures thereof.

In the method, step (b) can further comprise chemical treatment, electropolishing, wet polishing, argon plasma etching, oxygen plasma cleaning, annealing, or exposure to high vacuum to remove at least a portion of the resistive surface region thereby forming a solid state electrolyte.

In another aspect, the present disclosure provides a method for forming a solid state electrolyte. The method can comprise (a) providing a precursor electrolyte comprising an oxide of a metal, the precursor electrolyte having a resistive surface region; and (b) heating the precursor electrolyte at a temperature above a melting point of the metal to remove at least a portion of the resistive surface region thereby forming a solid state electrolyte. The resistive surface region can comprise LiOH. The resistive surface region can comprise Li$_2$CO$_3$.

In the method, the precursor electrolyte can comprise a ceramic material having a formula of Li$_w$A$_x$M$_2$Re$_{3-y}$O$_z$ wherein w is 5-7.5, wherein A is selected from B, Al, Ga, In, Zn, Cd, Y, Sc, Mg, Ca, Sr, Ba, and any combination thereof, wherein x is 0-2, wherein M is selected from Zr, Hf, Nb, Ta, Mo, W, Sn, Ge, Si, Sb, Se, Te, and any combination thereof, wherein Re is selected from lanthanide elements, actinide elements, and any combination thereof, wherein y is 0.01-0.75, wherein z is 10.875-13.125, and wherein the material has a garnet-type or garnet-like crystal structure.

The precursor electrolyte can comprise Li$_7$La$_3$Zr$_2$O$_{12}$.

In the method, the precursor electrolyte can comprise a material having any combination oxide or phosphate materials with a garnet, perovskite, NaSICON, or LiSICON phase.

In the method, step (b) can further comprise heating at a temperature between 350° C. and 650° C. The resulting interfacial resistance between the electrode and the solid state electrolyte can be less than 500 ohm cm$^2$, or less than 450 ohm cm$^2$, or less than 400 ohm cm$^2$, or less than 350 ohm cm$^2$, or less than 300 ohm cm$^2$, or less than 250 ohm cm$^2$, or less than 200 ohm cm$^2$, or less than 150 ohm cm$^2$, or less than 100 ohm cm$^2$, or less than 75 ohm cm$^2$, or less than 50 ohm cm$^2$, or less than 25 ohm cm$^2$, or less than 10 ohm cm$^2$. In the method, step (b) can further comprise heating the precursor electrolyte under an inert gas atmosphere. In the method, step (b) can further comprise heating the precursor electrolyte in the presence of an anhydrous solvent. In the method, step (c) can occur within 1 second to 90 minutes after step (b).

In the method, the electrode can comprise an anode. The anode can consist essentially of lithium metal.

In another aspect, the present disclosure provides a method for forming a solid state electrolyte. The method can comprise: (a) providing a precursor electrolyte having a resistive surface region; and (b) removing at least a portion of the resistive surface region thereby forming a solid state electrolyte, wherein removing at least a portion of the resistive surface region comprises a chemical treatment, electropolishing, wet polishing, argon plasma etching, oxygen plasma cleaning, annealing, or exposure to high vacuum. The resistive surface region can comprise LiOH. The resistive surface region can comprise Li$_2$CO$_3$.

In the method, the precursor electrolyte can comprise a ceramic material having a formula of Li$_w$A$_x$M$_2$Re$_{3-y}$O$_z$ wherein w is 5-7.5, wherein A is selected from B, Al, Ga, In, Zn, Cd, Y, Sc, Mg, Ca, Sr, Ba, and any combination thereof, wherein x is 0-2, wherein M is selected from Zr, Hf, Nb, Ta, Mo, W, Sn, Ge, Si, Sb, Se, Te, and any combination thereof, wherein Re is selected from lanthanide elements, actinide elements, and any combination thereof, wherein y is 0.01-0.75, wherein z is 10.875-13.125, and wherein the material has a garnet-type or garnet-like crystal structure.

The precursor electrolyte can comprise Li$_7$La$_3$Zr$_2$O$_{12}$.

In the method, the precursor electrolyte can comprise a material having any combination oxide or phosphate materials with a garnet, perovskite, NaSICON, or LiSICON phase.

In the method, step (b) can further comprise heating the precursor electrolyte at a temperature between 400° C. and 600° C. The resulting interfacial resistance between the electrode and the solid state electrolyte can be less than 500 ohm cm$^2$, or less than 450 ohm cm$^2$, or less than 400 ohm cm$^2$, or less than 350 ohm cm$^2$, or less than 300 ohm cm$^2$, or less than 250 ohm cm$^2$, or less than 200 ohm cm$^2$, or less than 150 ohm cm$^2$, or less than 100 ohm cm$^2$, or less than 75 ohm cm$^2$, or less than 50 ohm cm$^2$, or less than 25 ohm cm$^2$, or less than 10 ohm cm$^2$. In the method, step (b) can further comprise heating the precursor electrolyte at a temperature between 400° C. to 600° C. in the presence of an anhydrous solvent.

In the method, the electrode can comprise an anode. The anode can consist essentially of lithium metal.

In another aspect, the present disclosure provides a method for forming a solid state electrolyte. The method can comprise: (a) providing a precursor electrolyte having a resistive surface region; (b) removing at least a portion of the resistive surface region by polishing, and (c) heating the precursor electrolyte thereby forming a solid state electrolyte. The resistive surface region can comprise LiOH. The resistive surface region can comprise Li$_2$CO$_3$. In the method, the electrode can comprise an anode. The anode can consist essentially of lithium metal.

In the method, the precursor electrolyte can comprise a ceramic material having a formula of Li$_w$A$_x$M$_2$Re$_{3-y}$O$_z$ wherein w is 5-7.5, wherein A is selected from B, Al, Ga, In, Zn, Cd, Y, Sc, Mg, Ca, Sr, Ba, and any combination thereof, wherein x is 0-2, wherein M is selected from Zr, Hf, Nb, Ta, Mo, W, Sn, Ge, Si, Sb, Se, Te, and any combination thereof, wherein Re is selected from lanthanide elements, actinide elements, and any combination thereof, wherein y is 0.01-0.75,
wherein z is 10.875-13.125, and
wherein the material has a garnet-type or garnet-like crystal structure.

The precursor electrolyte can comprise $Li_7La_3Zr_2O_{12}$.

In the method, the precursor electrolyte can comprise a material having any combination oxide or phosphate materials with a garnet, perovskite, NaSICON, or LiSICON phase.

In the method, step (b) can comprise removing the portion of the resistive surface region by dry polishing. In the method, step (b) can comprise removing the portion of the resistive surface region by wet polishing. In the method, step (c) can comprise heating the precursor electrolyte in a temperature range of 200° C. to 500° C.

The resulting interfacial resistance between the electrode and the solid state electrolyte can be less than 500 ohm $cm^2$, or less than 450 ohm $cm^2$, or less than 400 ohm $cm^2$, or less than 350 ohm $cm^2$, or less than 300 ohm $cm^2$, or less than 250 ohm $cm^2$, or less than 200 ohm $cm^2$, or less than 150 ohm $cm^2$, or less than 100 ohm $cm^2$, or less than 75 ohm $cm^2$, or less than 50 ohm $cm^2$, or less than 25 ohm $cm^2$, or less than 10 ohm $cm^2$.

In another aspect, the present disclosure provides an electrochemical device comprising: a cathode; a solid state electrolyte; an anode comprising an electrochemically active metal, wherein an interfacial resistance between the anode and the solid state electrolyte can be less than 500 ohm $cm^2$, or less than 450 ohm $cm^2$, or less than 400 ohm $cm^2$, or less than 350 ohm $cm^2$, or less than 300 ohm $cm^2$, or less than 250 ohm $cm^2$, or less than 200 ohm $cm^2$, or less than 150 ohm $cm^2$, or less than 100 ohm $cm^2$, or less than 75 ohm $cm^2$, or less than 50 ohm $cm^2$, or less than 25 ohm $cm^2$, or less than 10 ohm $cm^2$. The electrochemically active metal can comprise lithium, magnesium, sodium, or zinc. The anode can consist essentially of lithium metal. The cathode can comprise a lithium host material selected from the group consisting of lithium metal oxides wherein the metal is one or more aluminum, cobalt, iron, manganese, nickel and vanadium, and lithium-containing phosphates having a general formula $LiMPO_4$ wherein M is one or more of cobalt, iron, manganese, and nickel. The lithium host material can be selected from the group consisting of lithium nickel manganese cobalt oxides.

In the electrochemical device, the solid state electrolyte can comprise a ceramic material having a formula of $Li_wA_xM_2Re_{3-y}O_z$
wherein w is 5-7.5,
wherein A is selected from B, Al, Ga, In, Zn, Cd, Y, Sc, Mg, Ca, Sr, Ba, and any combination thereof,
wherein x is 0-2,
wherein M is selected from Zr, Hf, Nb, Ta, Mo, W, Sn, Ge, Si, Sb, Se, Te, and any combination thereof,
wherein Re is selected from lanthanide elements, actinide elements, and any combination thereof,
wherein y is 0.01-0.75,
wherein z is 10.875-13.125, and
wherein the material has a garnet-type or garnet-like crystal structure.

In the electrochemical device, the solid state electrolyte can comprise a material having any combination oxide or phosphate materials with a garnet, perovskite, NaSICON, or LiSICON phase.

The foregoing and other aspects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims and herein for interpreting the scope of the invention.

Figure 1:
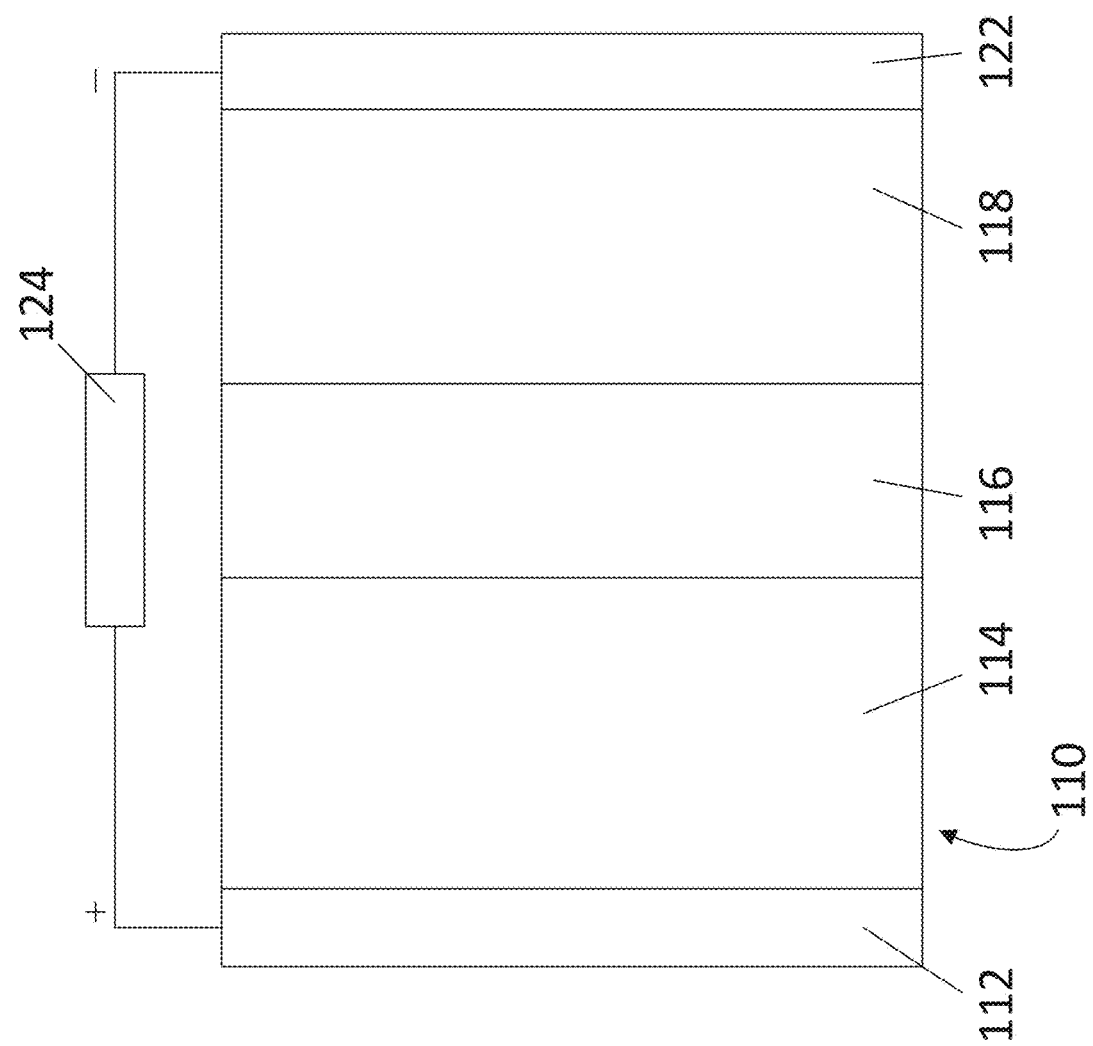
FIG. 1 is a schematic of a lithium metal battery.

The invention will be better understood and features, aspects and advantages other than those set forth above will become apparent when consideration is given to the following detailed description thereof. Such detailed description makes reference to the drawings.

DETAILED DESCRIPTION OF THE INVENTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. Skilled artisans will recognize the examples provided herein have many useful alternatives and fall within the scope of embodiments of the invention.

The various embodiments described herein provide methods for forming an interfacial layer between a solid state electrolyte and a lithium metal anode. The interstitial layer comprises an electronically conducting layer positioned between the solid state electrolyte and the lithium metal anode to improve the critical current density by lowering the area-specific resistance at the interface.

The term "solid-electrolyte" as used herein can refer to a phase which acts to increase the ionic conductivity of the composite electrode.

The term "critical current density (CCD)" as used herein can refer to the current density a solid electrolyte can support before failure is observed.

The term "area-specific resistance (ASR)" as used herein can refer to the area specific resistance of any component, but is generally used to define the resistance between the metal anode and solid electrolyte interface.

The term "blocking" as used herein can refer to a material with sufficiently low lithium solubility as determined by the thermodynamic phase diagrams such that the material can be considered non-reactive with lithium.

The term "semi-blocking" as used herein can refer to a material with moderately low lithium solubility as determined by the thermodynamic phase diagrams such that the material can be considered non-reactive with lithium.

The term "non-blocking" as used herein can refer to a material with significant lithium solubility as determined by the thermodynamic phase diagrams such that the material can be considered to undergo alloying reactions with lithium.

The term "conversion phase" as used herein can refer to a material which can be converted by a chemical or electrochemical reaction reduction reaction to form a blocking, semi-blocking, or non-blocking metallically conductive coating.

The term "metal" as used herein can refer to alkali metals, alkaline earth metals, lanthanoids, actinoids, transition metals, post-transition metals, metalloids, and selenium.

Currently, garnet phase electrolytes such as $Li_7La_3Zr_2O_{12}$ (LLZO) have been demonstrated to have a high lithium ion conductivity, negligible electronic conductivity, high temperature stability, reasonable stability in ambient air, and electrochemical stability against high voltage cathodes and lithium metal anodes. However, garnet phase electrolytes are susceptible to the formation of resistive species on the surface of the solid state electrolyte, which can lead to a high impedance between the anode and the solid state electrolyte. These resistive species can also contribute to low critical current densities (CCD), which leads to negative performance implications.

Previous fundamental work has shown how the area-specific resistance (ASR) effects the critical current density (CCD) as a function of temperature. See, Sharafi et al. "Characterizing the Li—$Li_7La_3Zr_2O_{12}$ interface stability and kinetics as a function of temperature and current density." *Journal of Power Sources*, 302 (2016): 135-139. One of the factors controlling the CCD is the interfacial ASR between the lithium anode and solid state electrolyte. A lower ASR value results in a higher CCD which is beneficial for the operation of a bulk scale solid state battery at reasonable power levels. As such, methods to improve the CCD by lowering the ASR add value to the technology.

One of the factors that can lead to an increased ASR is the formation of resistive species that form on the surface of the garnet phase when exposed to ambient air. In some instances, moisture from the air can react with the LLZO garnet to form LiOH according to the following reaction:

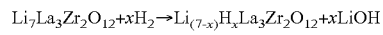

$$Li_7La_3Zr_2O_{12}+xH_2 \rightarrow Li_{(7-x)}H_xLa_3Zr_2O_{12}+xLiOH$$

After LiOH has formed on the surface of the garnet, it can getter or absorb atmospheric $CO_2$ to form another resistive species such as $Li_2CO_3$. In some instances, this reaction occurs according to one of the following reactions:

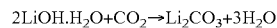

$$2LiOH.H_2O+CO_2 \rightarrow Li_2CO_3+3H_2O$$

or

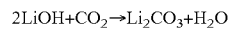

$$2LiOH+CO_2 \rightarrow Li_2CO_3+H_2O$$

The spontaneous formation of LiOH and $Li_2CO_3$ on the surface of solid state electrolytes due to the exposure to ambient air has made the manufacturing process of solid state lithium metal batteries difficult. A process capable of manufacturing in ambient air is desirable since it simplifies manufacturing, resulting in lower production costs. Mechanical removal of the resistive species has been shown to reduce the ASR; however, mechanical removal of the resistive species is not amenable to a manufacturing environment. It is also known that the removal of resistive species can be done by treating the surface of the solid state electrolyte with acid. However, this approach has negative consequences for the performance of the electrochemical device.

One embodiment described herein relates to a method for reducing the ASR at the interface between the solid state electrolyte and the anode by removing the resistive species. In one non-limiting example application, a solid state electrolyte 116 can be used in a lithium metal battery 110 as depicted in FIG. 1. The lithium metal battery 110 includes a current collector 112 (e.g., aluminum) in contact with a cathode 114. A solid state electrolyte 116 is arranged between the cathode 114 and an anode 118, which is in contact with a current collector 122 (e.g., aluminum). The current collectors 112 and 122 of the lithium ion battery 10 may be in electrical communication with an electrical component 124. The electrical component 124 could place the lithium metal battery 110 in electrical communication with an electrical load that discharges the battery or a charger that charges the battery.

The first current collector 112 and the second current collector 122 can comprise a conductive metal or any suitable conductive material. In some embodiments, the first current collector 112 and the second current collector 122 comprise aluminum, nickel, copper, combinations and alloys thereof. In other embodiments, the first current collector 112 and the second current collector 122 have a thickness of 0.1 microns or greater. It is to be appreciated that the thicknesses depicted in FIG. 1 are not drawn to scale, and that the thickness of the first current collector 112 and the second current collector 122 may be different.

A suitable active material for the cathode 114 of the lithium metal battery 110 is a lithium host material capable of storing and subsequently releasing lithium ions. An example cathode active material is a lithium metal oxide wherein the metal is one or more aluminum, cobalt, iron, manganese, nickel and vanadium. Non-limiting example lithium metal oxides are $LiCoO_2$ (LCO), $LiFeO_2$, $LiMnO_2$ (LMO), $LiMn_2O_4$, $LiNiO_2$ (LNO), $LiNi_xCo_yO_2$, $LiMn_{x-}Co_yO_2$, $LiMn_xNi_yO_2$, $LiMn_xNi_yO_4$, $LiNi_xCo_yAl_zO_2$, $LiNi_{1/3}Mn_{1/3}Co_{1/3}O_2$ and others. Another example of cathode active materials is a lithium-containing phosphate having a general formula $LiMPO_4$ wherein M is one or more of cobalt, iron, manganese, and nickel, such as lithium iron phosphate (LFP) and lithium iron fluorophosphates. Many different elements, e.g., Co, Mn, Ni, Cr, Al, or Li, may be substituted or additionally added into the structure to influence electronic conductivity, ordering of the layer, stability on delithiation and cycling performance of the cathode materials. The cathode active material can be a mixture of any number of these cathode active materials.

In some embodiments, a suitable active material for the anode 118 of the lithium metal battery 110 consists of lithium metal. In other embodiments, an example anode 118 material consists essentially of lithium metal. Alternatively, a suitable anode 118 consists essentially of magnesium, sodium, or zinc metal.

An example solid state electrolyte 116 material for the lithium metal battery 110 can include an electrolyte material having the formula $Li_uRe_vM_wA_xO_y$, wherein Re can be any combination of elements with a nominal valance of +3 including La, Nd, Pr, Pm, Sm, Sc, Eu, Gd, Tb, Dy, Y, Ho, Er, Tm, Yb, and Lu;

M can be any combination of metals with a nominal valance of +3, +4, +5 or +6 including Zr, Ta, Nb, Sb, W, Hf, Sn, Ti, V, Bi, Ge, and Si;

A can be any combination of dopant atoms with nominal valance of +1, +2, +3 or +4 including H, Na, K, Rb, Cs, Ba, Sr, Ca, Mg, Fe, Co, Ni, Cu, Zn, Ga, Al, B, and Mn; u can vary from 3-7.5;

v can vary from 0-3;

w can vary from 0-2; and y can vary from 11-12.5.

$Li_7La_3Zr_2O_{12}$ (LLZO) materials are beneficial for use as the solid state electrolyte 116 material for the lithium metal battery 110.

Another example solid state electrolyte 116 can include any combination oxide or phosphate materials with a garnet, perovskite, NaSICON, or LiSICON phase. The solid state electrolyte 116 of the lithium metal battery 110 can include any solid-like material capable of storing and transporting ions between the anode and cathode, so long as the solid-like material has negligible electronic conductivity and is electrochemically stable against high voltage cathodes and lithium metal anodes.

Figure 2:
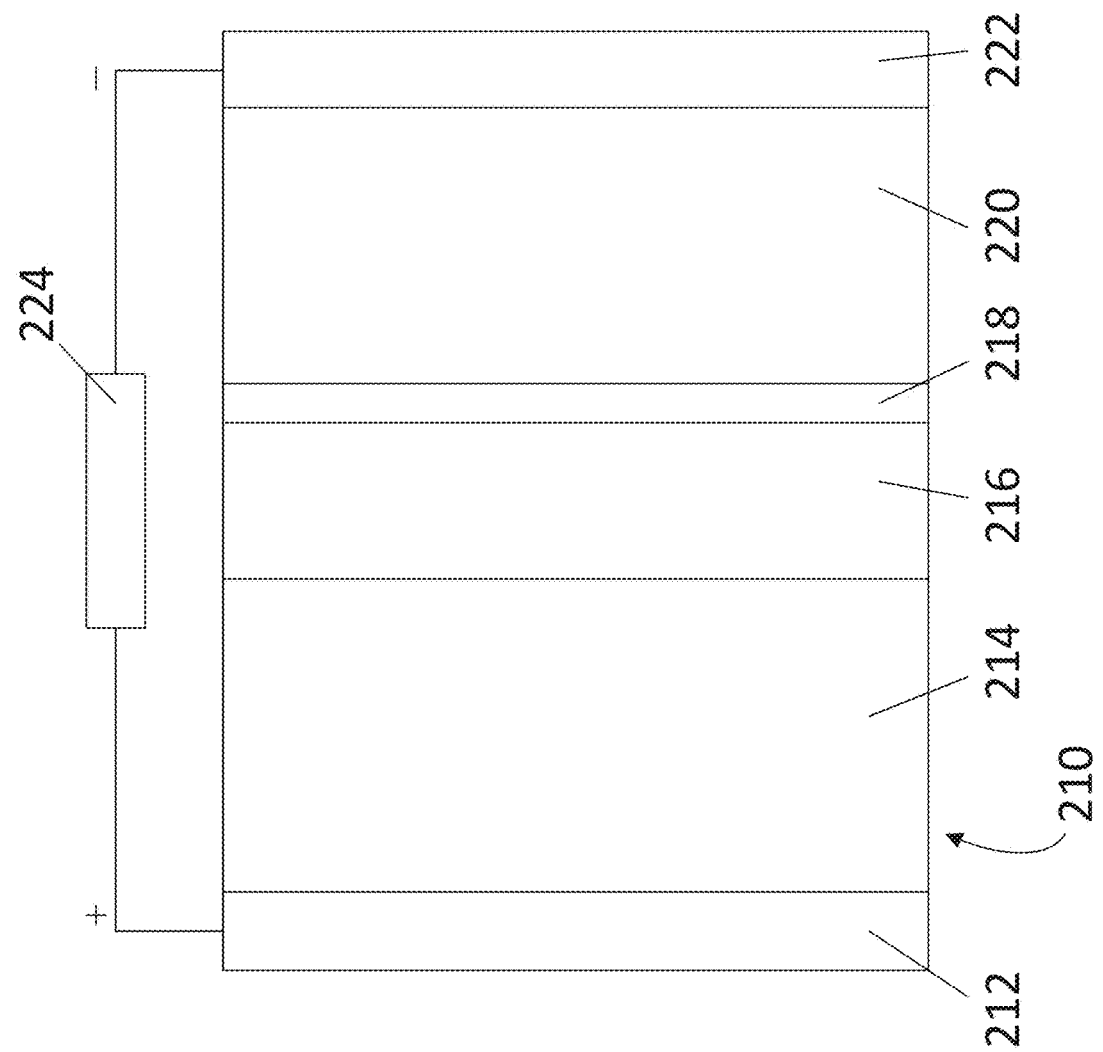
FIG. 2 is a schematic of a lithium metal battery with an interfacial coating between the anode and the solid state electrolyte.

FIG. 2 shows a non-limiting example application of a lithium metal battery 210 that includes an interfacial layer 218 according to one embodiment of the present disclosure. The interfacial layer 218 assists in lowering the ASR between a solid state electrolyte 216 and an anode 220 by homogenizing the applied current density. The lithium metal battery 210 also includes a first current collector 212 (i.e., aluminum) in contact with a cathode 214. The solid state electrolyte 216 is arranged between the cathode 214 and the interfacial layer 218. The interfacial layer 218 is arranged between the solid state electrolyte 216 and the anode 220, which is in contact with a second current collector 222 (i.e., copper). The first current collector 212 and the second current collector 222 of the lithium metal battery 210 may be in electrical communication with an electrical component 224. The electrical component 224 could place the lithium metal battery 210 in electrical communication with an electrical load that discharges the battery or a charger that charges the battery.

In some embodiments, a suitable first current collector 212 and second current collector 222 can comprise any conductive material listed above. A suitable active material for the cathode 214 of the lithium metal battery 210 is one or more of the lithium host materials listed above. A suitable active material for the anode 218 of the lithium metal battery 210 can be one or more of the materials listed above. A suitable solid state electrolyte material for the solid state electrolyte 216 of the lithium metal battery 210 is one or more of the solid state electrolyte materials listed above.

In some embodiments, a suitable interfacial layer 218 can comprise any phase which is electronically conductive. These phases can include metals, ceramics, or polymeric materials. In other non-limiting examples, the interfacial layer 218 may comprise non-blocking metals, semi-blocking metals, blocking metals, and mixtures thereof. In some aspects, the interfacial layer 218 has a second electronic conductivity that is greater than a first electronic conductivity of the solid state electrolyte 216. LLZO materials are beneficial for use in the solid state electrolyte 21, and have been reported as having an electronic conductivity of $2\times10^{-8}$ S/cm. See, Ezhiyl Rangasamy, Jeff Wolfenstine, Jeffrey Sakamoto, "The role of Al and Li concentration on the formation of cubic garnet solid electrolyte of nominal composition $Li_7La_3Zr_2O_{12}$", Solid State Ionics 206 (2012) 28.

In some aspects, the second electronic conductivity of the interfacial layer 218 is greater than $1\times10^{-7}$ S/cm, or greater than $1\times10^{-6}$ S/cm, or greater than $1\times10^{-5}$ S/cm, or greater than $1\times10^{-4}$ S/cm, or greater than $1\times10^{-3}$ S/cm, or greater than $1\times10^{-2}$ S/cm, or greater than $1\times10^{-1}$ S/cm.

In other non-limiting examples of the present disclosure, the interfacial layer 218 includes non-blocking metals such as aluminum, lead, zinc, indium, gallium, magnesium, silica, bismuth, and combinations thereof. The interfacial layer 218 may also comprise semi-blocking metals such as gold, silver, platinum, copper, chromium, iron, cobalt, steel, stainless steel, and combinations thereof. In other examples, the interfacial layer 218 includes blocking metals such as nickel, molybdenum, and titanium. Additionally, any alloy or combination of blocking, semi-blocking, and/or non-blocking metals may be used.

In some embodiments, the interfacial layer 218 includes any electronically conducting polymeric material such as polyacetylene, polypyrrole, polyaniline, poly(p-phenylene vinylene) (PPV), poly(3-alkylthiophenes), poly(3,4-ethylenedioxythiophene) (PEDOT), poly(p-phenylene sulfide), their copolymers, and mixtures thereof.

In some non-limiting examples of the present disclosure, the interfacial layer 218 includes any electronically conducting ceramic. The electronically conducting ceramic can include one or more metal oxide such as zinc oxide, aluminum, gallium, or indium doped zinc oxide, fluorine doped tin oxide, indium tin oxide, indium-doped cadmium-oxide, graphene, carbon nanotubes, amorphous carbon, vanadium oxide, silicon carbide, titanium nitride, tantalum carbide, lanthanum doped strontium titanate, and lanthanum doped barium titanate.

The present disclosure also provides a method for forming an electrochemical device and subsequently treating the surface of the solid state electrolyte 116 to remove a resistive species and reduce the ASR. The method includes providing a precursor electrolyte having a resistive surface region. A suitable precursor electrolyte is one or more of the solid state electrolyte materials listed above. In some embodiments, the resistive surface region is a thin film that forms on the surface of the precursor electrolyte. In some embodiments, the resistive surface region includes resistive species such as LiOH or $Li_2CO_3$, but could include any resistive species that contribute to the overall resistance at the interface. The method also includes heating the precursor electrolyte to remove at least a portion of the resistive surface region thereby forming a solid state electrolyte 116. The solid state electrolyte 116 is then placed in contact with an electrode. In some embodiments, the electrode is an anode 118.

In some embodiments, heating the precursor electrolyte to remove at least a portion of the resistive surface region occurs at a temperature greater than 180° C., or greater than 200° C., or greater than 250° C., or greater than 300° C., or greater than 350° C., or greater than 400° C., or greater than 450° C., or greater than 500° C., or greater than 550° C., or greater than 600° C., or greater than 650° C., or greater than 700° C., or greater than 750° C., or greater than 800° C., or greater than 850° C., or greater than 900° C., or greater than 950° C., or greater than 1000° C. Heating the precursor electrolyte to remove at least a portion of the resistive surface region can occur for any amount of time, and can be performed at any pressure including above, at, or below atmospheric pressure.

In some embodiments, heating the precursor electrolyte to remove at least a portion of the resistive surface region includes removing between 0.1% and 99.9% of the resistive surface region. In some embodiments, heating the precursor electrolyte removes 5% or greater, 10% or greater, 15% or greater, 20% or greater, 25% or greater, 30% or greater, 35% or greater, 40% or greater, 45% or greater, 50% or greater, 55% or greater, 60% or greater, 65% or greater, 70% or greater, 75% or greater, 80% or greater, 85% or greater, 90% or greater, 95% or greater of the resistive surface region.

In some embodiments, heating the precursor electrolyte to remove at least a portion of the resistive surface region results in an electrochemical device 110 where the interfacial resistance between the anode 118 and the solid state electrolyte 116 is less than 500 ohm $cm^2$. In other embodiments, the interfacial resistance between the anode and the solid state electrolyte 116 is less than 450 ohm $cm^2$, or is less than 400 ohm $cm^2$, or is less than 350 ohm $cm^2$, or is less than 300 ohm $cm^2$, or is less than 250 ohm $cm^2$, or is less than 200 ohm $cm^2$, or is less than 150 ohm $cm^2$, or is less than 100 ohm $cm^2$, or is less than 75 ohm $cm^2$, or is less than 50 ohm $cm^2$, or is less than 25 ohm $cm^2$, or is less than 10 ohm $cm^2$.

In some embodiments, heating the precursor electrolyte to remove at least a portion of the resistive surface region occurs in ambient air. In other embodiments, heating the precursor electrolyte to remove at least a portion of the resistive surface region occurs heating in an atmosphere without the presence of moisture or $CO_2$. In some embodiments, the atmosphere includes an inert gas. A suitable inert gas includes helium, argon, neon, xenon, krypton, radon, and nitrogen. In some embodiments, the contamination layers are removed under flow of pure oxygen. In other embodiments, the atmosphere includes an anhydrous solvent. Suitable anhydrous solvents include, without limitation, ethanol, 2-propanol, acetone, acetonitrile, chloroform, dichloromethane, dimethyl sulfoxide, ethyl acetate, hexane, methanol, tetrahydrofuran, and toluene.

In some embodiments, before the solid state electrolyte 116 is placed in contact with the electrode to form an interface, the heating step can first be performed in an atmosphere without the presence of moisture or $CO_2$. The solid state electrolyte 116 can then be exposed for a time period to environments which do contain $CO_2$ during transfer and prior to forming the interface. In some embodiments, the time period is between less than one second and less than one day. In some embodiments, the time period is less than 1 second, or less than 10 seconds, or less than 20 seconds, or less than 30 seconds, or less than 40 seconds, or less than 50 seconds, or less than 60 seconds, or less than 90 seconds. In other embodiments, the time period is less than 5 minutes, less than 30 minutes, or less than 60 minutes. In some embodiments, the time period is less than 5 hours, or less than 10 hours, or less than 15 hours, or less than 20 hours, or less than 24 hours.

In some embodiments, an interfacial layer 218 can be deposited on the solid state electrolyte 216 prior to contacting the treated solid state electrolyte 218 to the electrode. A suitable interfacial layer 218 includes one or more of the interfacial layers listed above. In some embodiments, removing at least a portion of the resistive surface region includes chemical treatment, electropolishing, wet polishing, argon plasma etching, oxygen plasma cleaning, annealing, mechanical polishing, or exposure to high vacuum. Each of the steps above can be performed alone, in combination, or in sequence to remove at least a portion of the resistive surface region. Additionally, each of these steps can be used in sequence or in combination with heat treatment.

In some embodiments, removing at least a portion of the resistive surface region on the precursor electrolyte using any of the methods above results in an electrochemical device 210 where the interfacial resistance between the anode 218 and the solid state electrolyte 216 is less than 500 ohm $cm^2$. In other embodiments, the interfacial resistance between the anode and the solid state electrolyte 116 is less than 450 ohm $cm^2$, or is less than 400 ohm $cm^2$, or is less than 350 ohm $cm^2$, or is less than 300 ohm $cm^2$, or is less than 250 ohm $cm^2$, or is less than 200 ohm $cm^2$, or is less than 150 ohm $cm^2$, or is less than 100 ohm $cm^2$, or is less than 75 ohm $cm^2$, or is less than 50 ohm $cm^2$, or is less than 25 ohm $cm^2$, or is less than 10 ohm $cm^2$.

The present disclosure also relates to forming a solid state electrolyte 116 that is substantially free of the resistive surface region. The method includes first providing the precursor electrolyte comprising an oxide of a metal, where the precursor electrolyte contains the resistive surface region. In one embodiment, the oxide material of the precursor electrolyte has a formula of $Li_wA_xM_2Re_{3-y}O_z$, where "$A_x$," "M," and "Re" are the metals. In some embodiments, "$A_x$" is selected from B, Al, Ga, In, Zn, Cd, Y, Sc, Mg, Ca, Sr, Ba, and any combination thereof. In some embodiments, x is between 0-2. In other embodiments, "M" is Zr, Hf, Nb, Ta, Mo, W, Sn, Ge, Si, Sb, Se, Te, and any combination thereof. In some embodiments, "$Re_{3-y}$" is selected from lanthanide elements, actinide elements, and any combination thereof. In some embodiments, y is between 0.01-0.75. In some embodiments, the precursor electrolyte comprises a material having any combination oxide or phosphate materials with a garnet, perovskite, NaSICON, or LiSICON phase.

EXAMPLES

The following Examples are provided in order to demonstrate and further illustrate certain embodiments and aspects of the present invention and are not to be construed as limiting the scope of the invention.

Example 1

Figure 3:
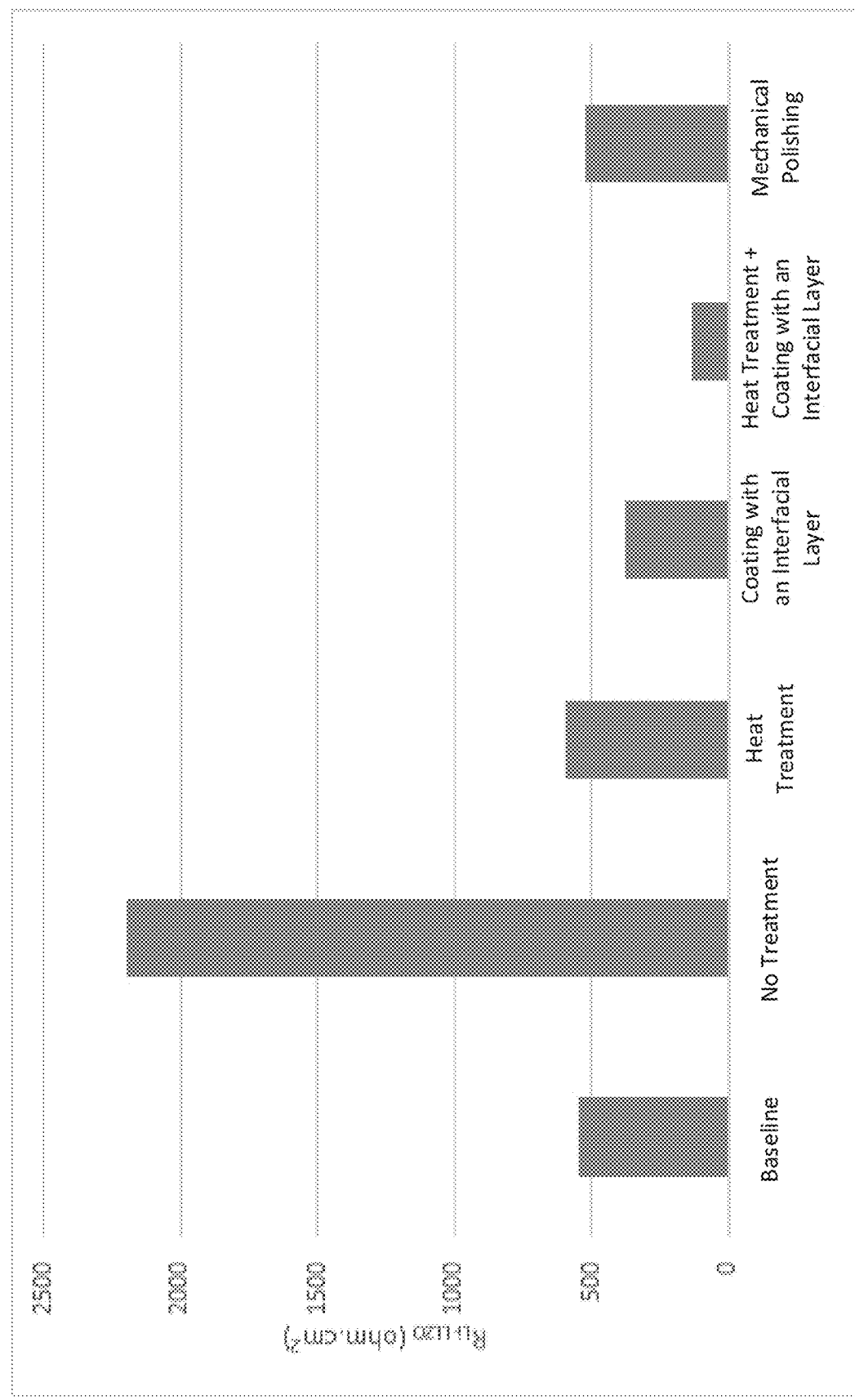
FIG. 3 shows the variation of the interfacial resistance between a lithium metal anode and a solid state electrolyte according to various aspects the present disclosure.

FIG. 3 shows a comparison of the interfacial resistance between the solid state electrolyte 116 and the anode 118 for several treatment methods that are consistent with various aspects of the present disclosure. Specifically, FIG. 3 compares treatment methods such as heat treatment, coating with an interfacial layer 218, heat treatment and coating with an interfacial layer 218, and mechanical polishing.

In Example 1, a garnet-type material with a nominal composition of $Li_{6.25}La_3Zr_2Al_{0.25}O_{12}$ was used as the solid state electrolyte material. $Li_{6.25}La_3Zr_2Al_{0.25}O_{12}$ (LLZO) can be prepared using a solid-state synthetic technique (see, E. Rangasamy, J. Wolfenstine, J. Sakamoto, *Solid State Ion.* 206 (2012) 28-32).

As a comparative example (identified as "Baseline" in FIG. 3), polishing of the LLZO in a dry room and an argon filled glovebox with no use of solvent was performed to mechanically remove a contamination layer from the surface of the LLZO (see, Sharafi et al., "Characterizing the Li—$Li_7La_3Zr_2O_{12}$ interface stability and kinetics as a function of temperature and current density", *Journal of Power Sources* 302 (2016) 135-139; and Ohta et al., "Electrochemical performance of an all-solid-state lithium ion battery with garnet-type oxide electrolyte", *Journal of Power Sources* 202 (2012) 332-335).

As another comparative example (identified as "No Treatment" in FIG. 3), no treatment was performed on the LLZO.

In one test procedure (identified as "Heat Treatment" in FIG. 3), the LLZO was heated at 400° C. for 1 hour.

In another test procedure (identified as "Coating with an Interfacial Layer" in FIG. 3), gold was sputter coated on the LLZO as an interfacial layer.

In another test procedure (identified as "Heat Treatment+ Coating with an Interfacial Layer" in FIG. 3), the LLZO was heated at 400° C. for 1 hour and then gold was sputter coated on the LLZO as an interfacial layer.

In another test procedure (identified as "Mechanical Polishing" in FIG. 3), polishing was performed on the LLZO to mechanically remove the contamination layer from the surface of the LLZO.

Solid-state symmetric cells were assembled by placing the LLZO, treated or not treated as described above in Example 1, between two lithium electrodes. The Li-LLZO interfacial resistance normalized per unit area was characterized and is shown in FIG. 3.

Example 2

Figure 4:
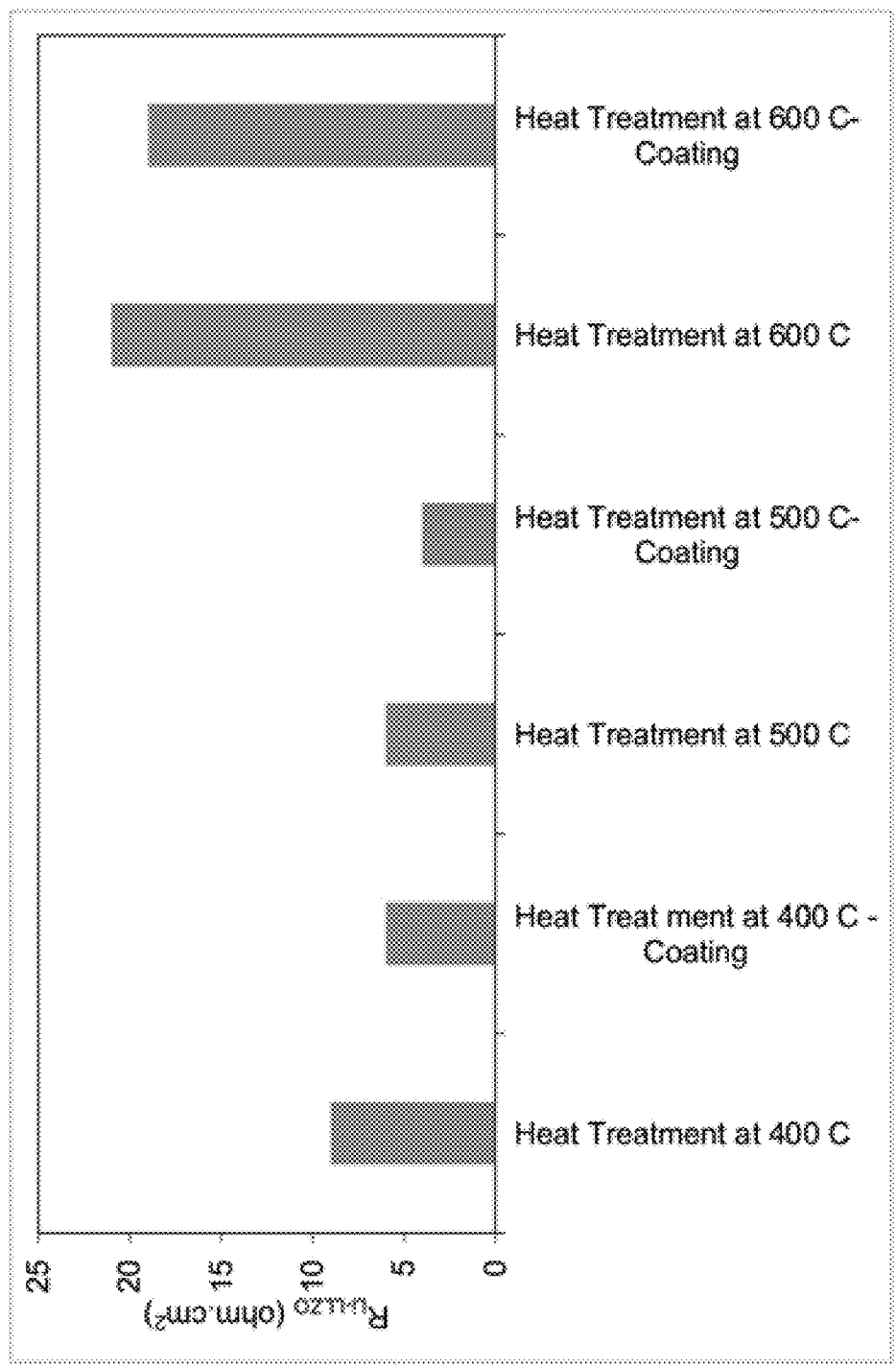
FIG. 4 shows the variation of the interfacial resistance between a lithium metal anode and a solid state electrolyte at different heat treatment temperatures according to some aspects of the present disclosure. The untreated and uncoated interfacial resistance between the lithium metal anode and the solid state electrolyte began at 5,000 to 10,000 ohm $cm^2$.

FIG. 4 shows a comparison of the interfacial resistance between the solid state electrolyte 116 and the anode 118 for several treatment methods that are consistent with various aspects of the present disclosure. Specifically, FIG. 4 compares the interfacial resistance between the solid state electrolyte 116 and the anode 118 at different heat treatment temperatures, and with and without interfacial layers 218. The untreated, uncoated interfacial resistance of the starting material was between 5000-10000 ohm $cm^2$.

In Example 2, a garnet-type material with a nominal composition of $Li_{6.25}La_3Zr_2Al_{0.25}O_{12}$ was used as the solid state electrolyte. $Li_{6.25}La_3Zr_2Al_{0.25}O_{12}$ (LLZO) can be prepared using a solid-state synthetic technique (see, E. Rangasamy, J. Wolfenstine, J. Sakamoto, *Solid State Ion.* 206 (2012) 28-32).

In one test procedure (identified as "Heat Treatment at 400 C" in FIG. 4), the LLZO was heated at 400° C. for 3 hours.

In another test procedure (identified as "Heat Treatment at 400 C—Coating" in FIG. 4), the LLZO was heated at 400° C. for 3 hours and then gold was sputter coated on the LLZO as an interfacial layer.

In another test procedure (identified as "Heat Treatment at 500 C" in FIG. 4), the LLZO was heated at 500° C. for 3 hours.

In another test procedure (identified as "Heat Treatment at 500 C—Coating" in FIG. 4), the LLZO was heated at 500° C. for 3 hours and then gold was sputter coated on the LLZO as an interfacial layer.

In another test procedure (identified as "Heat Treatment at 600 C" in FIG. 4), the LLZO was heated at 600° C. for 3 hours.

In another test procedure (identified as "Heat Treatment at 600 C—Coating" in FIG. 4), the LLZO was heated at 600° C. for 3 hours and then gold was sputter coated on the LLZO as an interfacial layer.

Solid-state symmetric cells were assembled by placing the LLZO, treated or not treated as described above in Example 2, between two lithium electrodes. The Li-LLZO interfacial resistance normalized per unit area was characterized and is shown in FIG. 4.

Example 3

The impact of surface chemistry on the interfacial resistance between the $Li_7La_3Zr_2O_{12}$ (LLZO) solid-state electrolyte and a metallic lithium (Li) electrode was investigated in this Example. Control of surface chemistry allows the interfacial resistance to be reduced to 2 $\Omega cm^2$, lower than that of liquid electrolytes, without the need for interlayer coatings. $Li_2CO_3$ and LiOH result in poor wettability by Li and high interfacial resistance. On the basis of this mechanism, a procedure for removing these surface layers is demonstrated, which results in a dramatic increase in Li wetting and the elimination of nearly all interfacial resistance. The low interfacial resistance is maintained over one-hundred cycles and suggests a pathway to achieving high energy and power density solid-state batteries.

In this Example, we provide a mechanistic understanding of the interplay between interfacial chemistry and electrochemical performance at solid-solid interfaces in solid state batteries. This understanding provides design rules for engineering low-resistance interfaces. Accordingly, we demonstrate that the Li-LLZO interfacial resistance can be nearly eliminated (2 $\Omega cm^2$) through a coating-free process to modify the surface chemistry of LLZO.

This Example quantitatively demonstrates the relationships between interfacial chemistry, and facile charge transport. Equipped with this understanding, we demonstrate that controlling interfacial chemistry enables a pathway toward viable solid state batteries.

Example 3—Experimental Section

LLZO Specimen Preparation.

Cubic Al-doped LLZO with nominal composition of $Li_{6.25}Al_{0.25}La_3Zr_2O_{12}$ was prepared using the solid-state synthetic technique of Sharafi, A.; Yu, S.; Naguib, M.; Lee, M.; Ma, C.; Meyer, H. M.; Nanda, J.; Chi, M.; Siegel, D. J.; Sakamoto, J., "Impact of Air Exposure and Surface Chemistry on $Li—Li_7La_3Zr_2O_{12}$ Interfacial Resistance", J. Mater. Chem. A 2017, 5, 13475-13478. The calcined powder was densified using a custom rapid induction hot-press (RIHP) at 1100° C. and 62 MPa for 1 hour in graphite dies under argon shielding gas to achieve >97% relative density. Each sample was cut into 1±0.2 mm discs using a slow speed diamond saw. The discs were dry polished using 400 grit SiC sandpaper in air to ensure the parallel faces.

Surface Conditioning.

Various surface conditioning processes including dry polishing (DP), wet polishing (WP), and heat treatment (HT) were used. For DP, LLZO samples were polished manually using 400, 600, and 1200 grit sandpaper (Norton Corporation) in air without polishing fluid. For WP, an automated polisher (EcoMet 300 Pro, Buehler) was used. First, LLZO samples were ground using 1200 sand paper (Norton Corporation). After grinding, the samples were polished on Technotron polishing cloth (Leco Corporation) loaded with glycol-based diamond paste extender as the polishing fluid (Leco Corporation) and diamond polishing abrasives. The diamond polishing abrasive sequence ranged from 15, 6, 1 and down to 0.5 μm. After each diamond abrasive, samples were rinsed with ethanol to remove the residual polishing fluid from surface. Immediately after polishing, samples were transferred to an argon-filed glovebox. Heat treatment (HT) was conducted by placing the samples in a MgO boat and heating to temperatures between 200° C. to 500° C. in 100° C. intervals in a muffle furnace (MTI Corporation) for 180 minutes using 4° C. $min^{-1}$ as heating and cooling rate.

Surface Chemistry Characterization.

A Kratos Axis Ultra was used for all XPS experiments. A custom O-ring sealed airtight transfer device was used to transfer samples into the XPS tool without air exposure. Survey scans used a pass energy of 160 eV and were quantified using Shirley backgrounds and Kratos sensitivity factors for the La 3d, Zr 3p, C 1s, O 1s, and Li 1s peaks in Casa XPS. Core scans used a pass energy of 20 eV and were energy calibrated using the C—C bond energy at 284.8 eV. The O 1s peak was fitted with three species, LiOH at 531.1 eV, $Li_2CO_3$ at 532 eV, and oxide species at 528.6-529 eV. The C 1s peak was fitted with four species, adventitious carbon at 284.8 eV, which was used to calibrate the spectra, C—O at ~286 eV, O—C=O at 289 eV, and $Li_2CO_3$ at 290 eV.

Electrochemical Measurements.

Electrochemical measurements were performed to determine the effect of heat treatment on $R_{Li-LLZO}$ and the maximum critical current density (CCD). Metallic Li electrodes were prepared by scraping with a stainless-steel spatula to expose a clean surface. Li-LLZO-Li cells were compressed under a constant 350 kPa uniaxial pressure during cycling. EIS measurements were conducted on symmetric cells after assembly using a 100 mV amplitude in the frequency range of 7 MHz to 1 Hz using a VMP-300 biologic and EC-Lab V11.02 software. To ensure good contact between metallic Li and LLZO, cells were heated to 175° C. for 12 hours (preconditioning step). After cooling to room temperature, the change in cell resistance with a focus on $R_{Li-LLZO}$ was measured by EIS again. First, the entire spectrum was normalized for the contact area between Li and LLZO (area=1.26 $cm^2$). Then an equivalent circuit model was used to interpret the data. The EIS data were modeled using the equivalent circuit model shown in FIG. 6b. In this model, a combination of a resistor and a capacitor in parallel was used to represent each transport phenomenon in the cell. Thus, three parallel combinations were used in the model representing the bulk ($R_{bulk}$), the grain boundary ($R_{gb}$), and the Li-LLZO interface ($R_{Li-LLZO}$). Ideal capacitors were replaced with constant phase elements (CPE) to account for any nonideal behavior and dispersion in the time constant. The ideality of the CPE is represented by the coefficient α (α=1 shows the component is behaving as an ideal capacitor). The Q values for the CPE should be on the order of $10^{-12}$, $10^{-8}$, $10^{-6}$ F for bulk, grain boundary, and Li-LLZO interface, respectively.

Cycling behavior of Li-LLZO-Li symmetric cells was measured at room temperature between 0.01 and 1 mA $cm^{-2}$ to determine the CCD (the current density at which the cell voltage dropped to 0 V). Cycling was continued until evidence of short-circuiting was observed and marked by a sudden drop in polarization voltage. To examine the cycling behavior of LLZO, Li-LLZO-Li cells were galvanostatically cycled at ±0.2 mA $cm^{-2}$. During cell cycling, the cell impedance was measured every 20 cycles to evaluate the impact of electrochemical cycling on cell impedance and its stability. In the study of Example 3, all tests were repeated three times to ensure reproducibility.

Example 3—Results and Discussion

Surface Chemical Analysis.

The surface chemistry of LLZO is sensitive to air exposure. A contamination layer readily forms and is predominantly composed of lithium carbonate ($Li_2CO_3$), lithium hydroxide (LiOH), and other adventitious carbon species, which collectively result in high interfacial resistance between LLZO and metallic lithium. Dry polishing in an inert atmosphere can lower the interfacial resistance by partially cleaning the surface; however, the efficacy of this approach is limited to reducing the interface resistance from ~1000 $\Omega cm^2$ to ~100 $\Omega cm^2$. In Example 3, several surface conditioning protocols, including dry polishing (DP), wet polishing (WP), and heat treatments (HT), were employed in an effort to reduce the interfacial resistance, and their impact on LLZO surface chemistry was evaluated. Heat treatment between 200° C. and 500° C. in an inert atmosphere was conducted after dry and wet polishing.

Figure 5:
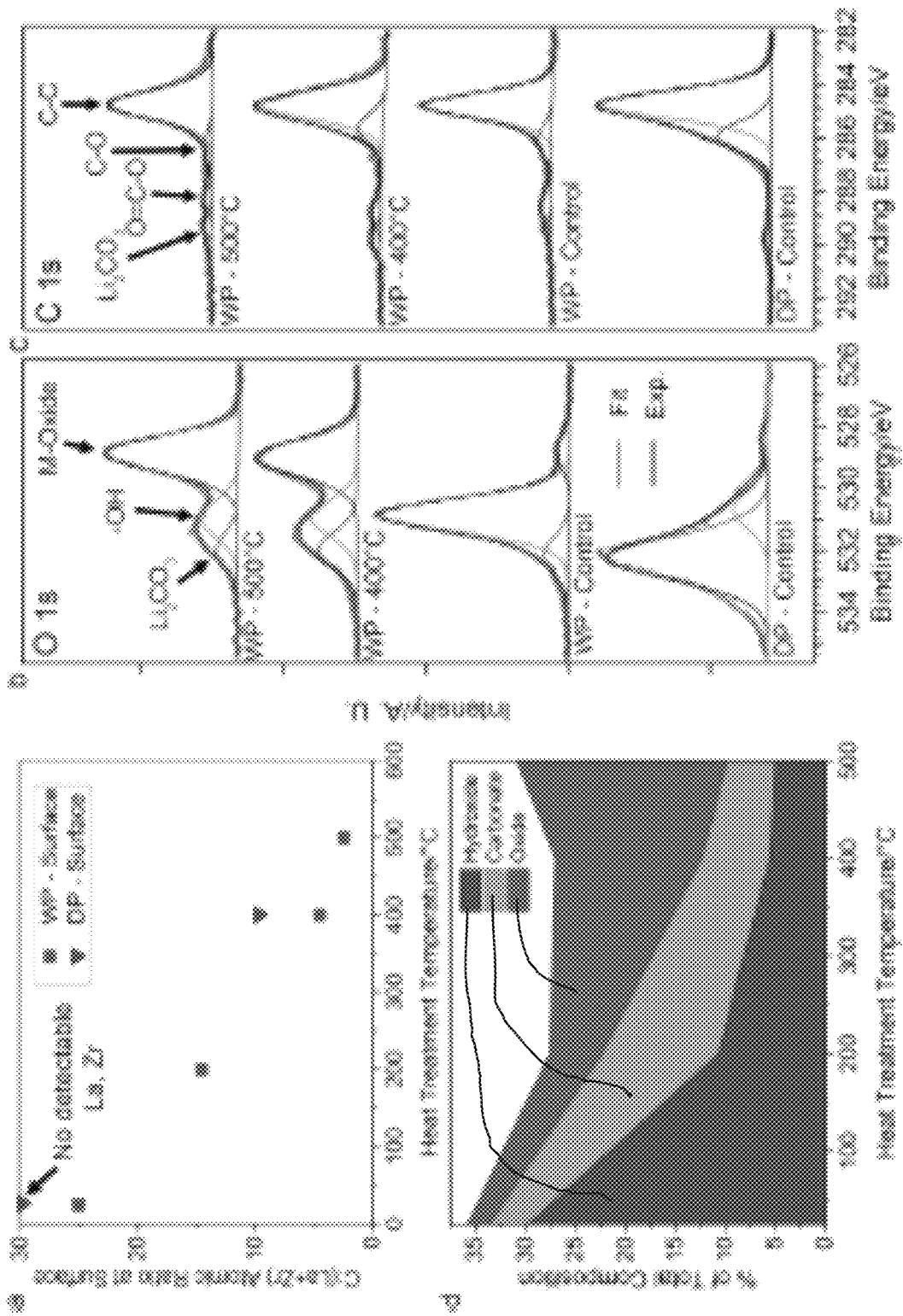
FIG. 5 shows X-ray photoelectron spectroscopy (XPS) analysis of LLZO before and after heat treatment at 400° C. and 500° C. In (a), C:(La+Zr) atomic ratio as a function of heat treatment temperature; in (b), O 1s; in (c), C 1s core levels; and in (d), percentage of total composition of different oxygen species on the LLZO surface as a function of heat treatment temperature after wet polishing (WP).

The surface chemistry of LLZO was analyzed using X-ray photoelectron spectroscopy (XPS) after each conditioning protocol (see FIG. 5). Measurements were performed on samples transferred without air exposure between an argon-filled glovebox and the ultrahigh vacuum XPS chamber. FIG. 5a shows that in samples conditioned with DP or WP (no HT), a surface layer blocks nearly all the signal attributed to La and Zr. In these cases, the surface layer is composed almost entirely of H, Li, C, and O (H content cannot be directly detected by XPS but can be observed as hydroxyl bonds). The nature of the bonds in which these species participate can be examined through high-resolution core-scans. The O 1s peak reveals a significant difference between the surface layer after wet versus dry polishing (see FIG. 5b). The WP surface consists of predominantly hydroxide species, while a greater concentration of carbonate species exists on the DP sample. This suggests that the use of polishing fluid protects the LLZO surface from reformation of carbonate species.

Samples that underwent heat treatment (HT) were first polished (DP or WP in ambient air) and then immediately transferred into an argon-filled glovebox where the samples were heated to different temperatures. Subsequent XPS analysis demonstrated significant variations in the surface chemistry of these samples. In FIG. 5a, a plot of the ratio of the C content to the summed La and Zr contents is used as a metric to quantify the amount of surface contamination. The lower the ratio, the more closely the surface resembles bulk LLZO. Some adventitious carbon is always observed on the LLZO surface, even for samples kept continuously in an argon atmosphere after HT, see FIG. 5c. The amount of contamination is observed to dramatically decrease after heating to 400° C. and 500° C. This is consistent with the O 1s core scans shown for these samples, which demonstrate that the predominantly hydroxide and carbonate surfaces before heating are converted to primarily oxide species (as expected in bulk LLZO) after heating (see FIG. 5b). In contrast, heating a DP sample to 400° C. did not change the surface as dramatically, with carbonate species still dominating. A plot of the fractional surface composition of the oxygen-containing species is shown in FIG. 5d for WP samples heated to different temperatures. As the HT temperature increases to 500° C., the oxide fraction steadily increases, the hydroxide fraction decreases, and the amount of carbonate remains roughly constant. In total, these observations suggest that: (1) compared to dry polishing, wet polishing is more effective at achieving a surface with low carbonate content, (2) heat treatment up to 500° C. can remove LiOH but is less effective at removing $Li_2CO_3$, and (3) of the strategies examined, the successive combination of wet polishing and heat treatment is the most effective at removing both carbonate and hydroxide surface contamination layers.

The removal of LiOH species at temperatures between 400° C. and 500° C. is consistent with prior thermogravimetric analysis, mass spectroscopy, and first-principles calculations. This suggests that the surface layer that reforms as a result of wet polishing is more easily removed by heat treatment, thereby making the combination of wet polishing and heat treatment in an inert atmosphere an attractive option to achieve a well-controlled LLZO surface prior to forming the anode-solid electrolyte (Li-LLZO) interface in a solid state battery.

Electrochemical Characterization.

Figure 6:
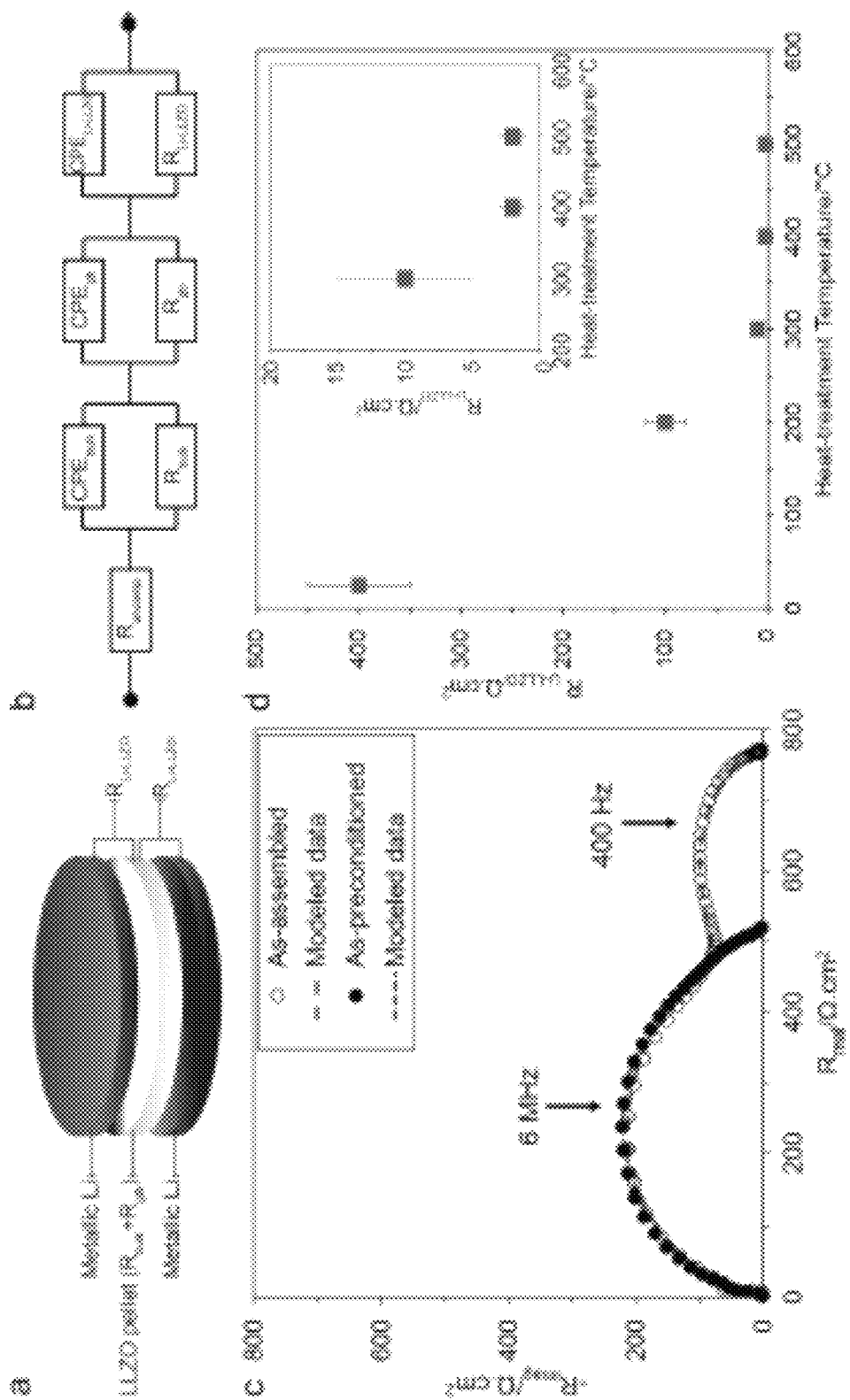
FIG. 6 shows: in (a), a schematic of the all solid-state Li-LLZO-Li cell; in (b), an equivalent circuit used for modeling the electrochemical impedance spectroscopy (EIS) data; in (c), a representative Nyquist plot of the Li-LLZO-Li cell (for LLZO heat-treated at 500° C.), as-assembled (○) and after preconditioning at 175° C. (•) wherein markers indicate experimental data and dotted lines represent from the equivalent circuit model simulation using the circuit shown in panel b; and in (d), the Li-LLZO interfacial resistance after preconditioning at 175° C. versus the heat-treatment temperature. N=3 for each heat treatment condition wherein error bars represent standard deviations.

Electrochemical impedance spectroscopy (EIS) was performed on Li-LLZO-Li symmetric cells (FIG. 6a) to measure the LLZO bulk ($R_{bulk}$), grain boundary ($R_{gb}$), and Li-LLZO interfacial ($R_{Li-LLZO}$) resistances for wet polishing (WP) and heat treatment (HT) samples between 200° C. and 500° C. EIS data were modeled using an equivalent circuit shown in FIG. 6b. This approach allowed for the direct measurement of the individual contributions to cell resistance and involves the correlation between characteristic frequencies and transport phenomena. Representative EIS spectra for a cell consisting of a WP and HT at 500° C. LLZO sample before and after preconditioning at 175° C. are shown in FIG. 6c (preconditioning was used to ensure good contact between metallic Li and LLZO by heating the Li-LLZO-Li cell to 175° C. for 12 hours). From FIG. 6c, it is apparent the LLZO total resistance ($R_{bulk}+R_{gb}$) has remained constant (500 $\Omega cm^2$), while $R_{Li-LLZO}$ dramatically decreased upon preconditioning at 175° C. and cooling. Initially, $R_{Li-LLZO}$ was approximately 400 $\Omega cm^2$, which is significantly lower than previous values reported for LLZO after dry polishing. After preconditioning at 175° C., a further dramatic reduction in $R_{Li-LLZO}$ was observed. The combination of wet polishing, heat treatment, and preconditioning results in an extremely small interfacial resistance of 2 $\Omega cm^2$.

FIG. 6d shows $R_{Li-LLZO}$ after preconditioning for wet polishing LLZO samples with no heat treatment and heat treatment at several temperatures between 200° C. and 500° C. With increasing heat treatment temperature, $R_{Li-LLZO}$ decreases from 400 to 2 $\Omega cm^2$. Importantly, the low interfacial resistance coincides with the removal of the surface contamination layer. Furthermore, the decrease in interfacial resistance closely follows the trend in surface chemistry with heat treatment temperature observed in XPS measurements, and with the improved wettability of the LLZO surface after heat treatment. Taken together, these observations provide quantitative evidence of the strong coupling between surface chemistry, wettability, and interfacial resistance.

Figure 7:
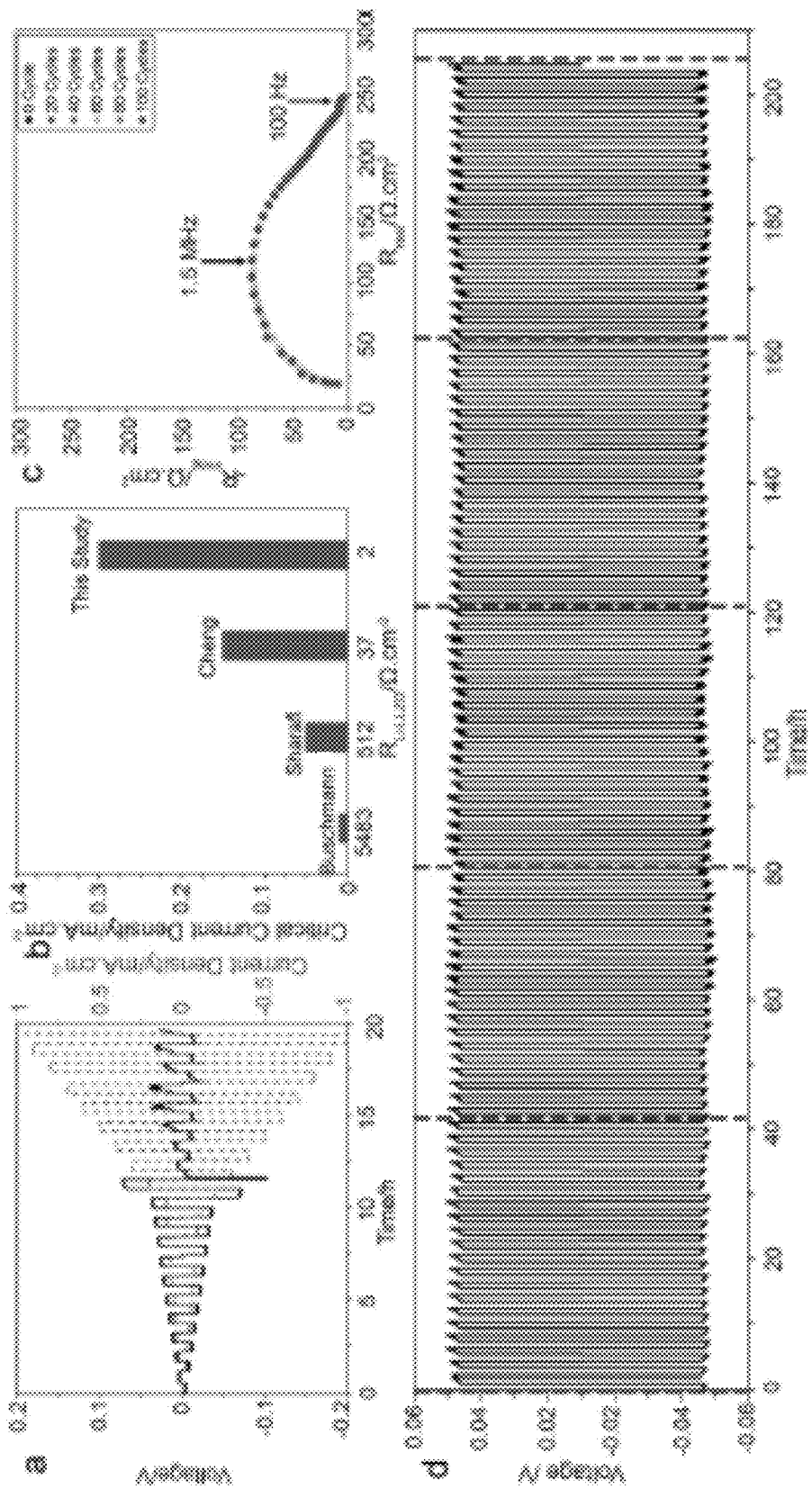
FIG. 7 shows: in (a), DC cycling of Li-LLZO-Li cells (LLZO heat treated to 500° C. after WP) at room temperature, stepping the current density from 0.01 to 1 mA $cm^{-2}$; in (b), the critical current density versus Li-LLZO interfacial resistance comparing the results of this disclosure with other studies available in the literature [i.e., Buschmann et al., Structure and Dynamics of the Fast Lithium Ion Conductor $Li_7La_3Zr_2O_{12}$, Phys. Chem. Chem. Phys. 2011, 13, 19378-19392; Sharafi et al., Characterizing the Li—$Li_7La_3Zr_2O_{12}$ Interface Stability and Kinetics as a Function of Temperature and Current Density, J. Power Sources, 2016, 302, 135-139; and Cheng et al., Effect of Surface Microstructure on Electrochemical Performance of Garnet Solid Electrolytes, ACS Appl. Mater. Interfaces, 2015, 7, 2073-2081]; in (c), Nyquist plots of a Li-LLZO-Li cell after each 20 cycles for the cell cycled 100 times; and in (d), galvanostatic cycling of Li-LLZO-Li at 0.2 mA $cm^{-2}$ for 100 cycles at 0.4 mAh $cm^{-2}$. The dotted line shows the times at which EIS was collected and is shown in panel d.

The cycling behavior and critical current density (CCD) of a wet polished-LLZO sample with heat treatment to 500° C. (WP+HT) were characterized using a combination of DC cycling and EIS analysis (see FIG. 7). The CCD is defined as the lowest current density at which cell shorting occurs due to Li metal penetration. After removal of the surface contamination, the CCD was determined to be 0.3 mA cm$^{-2}$ (see FIG. 7a). The CCD from the WP+HT sample prepared here is compared in FIG. 7b to other Li-LLZO-Li symmetric cells reported in the literature. The CCD measured in this study is one the highest values reported in literature for an LLZO solid state electrolyte. Our data indicate that the CCD and $R_{Li-LLZO}$ are inversely correlated, suggesting that higher power density can be achieved by controlling interfacial chemistry, and thus $R_{Li-LLZO}$.

To evaluate the stability of the interface after WP+HT upon cycling, a Li-LLZO-Li cell was cycled for one hundred cycles at ±0.2 mA cm$^{-2}$ at room temperature (see FIG. 7d). After every 20 cycles, EIS analysis was conducted to assess changes in $R_{bulk}$, $R_{gb}$, and $R_{Li-LLZO}$. FIG. 7c shows that negligible changes in the EIS spectra were observed, implying excellent stability of the interface and the absence of short-circuiting. Furthermore, the total cell resistance ($R_{bulk}+R_{gb}+R_{Li-LLZO}$) estimated using the DC cell polarization voltage (230 $\Omega cm^2$) (FIG. 7a) agrees well with the total cell resistance measured using EIS (240 $\Omega cm^2$). This agreement further validates the interpretation of the EIS data.

The DC and EIS characterization illustrate the importance of controlling interfacial chemistry. First, a low $R_{Li-LLZO}$ enables a path toward low resistance solid-state cell designs employing metallic lithium anodes. Second, reducing $R_{Li-LLZO}$ increases the critical current density. Although 0.3 mA cm$^{-2}$ is one of the highest reported critical current density values, it should be further increased to demonstrate relevance to vehicle electrification; the data in FIG. 7b suggest further tuning surface chemistry and reducing $R_{Li-LLZO}$ may be an approach to achieve higher CCD. Lastly, a clean and discrete Li-LLZO interface is preferred to minimize side reactions and mechanical degradation. In cycling tests, the interface kinetics appear to be stable when cycling at ±0.2 mA cm$^{-2}$ at room temperature. Altogether, the electrochemical characterization suggests wet polishing and heat treatment could enable the use of metallic Li anodes and LLZO in solid state batteries.

Example 3—Conclusions

Example 3 reveals the mechanism by which surface chemistry controls the resistance of the Li-LLZO interface.

By exploiting this mechanism, very low interfacial resistances, 2 Ωcm$^{-2}$, comparable to solid-liquid interfaces in Li-ion cells, can be achieved without the need for coatings. The lower interfacial resistance made possible by controlling surface chemistry resulted in a doubling of the critical current density. Moreover, this low interfacial resistance was preserved for one hundred cycles with no sign of short circuiting. This study of Example 3 clarifies the relationships between interfacial chemistry, interfacial resistance, and stable cycling. The knowledge gained enables the rational design of electrode/electrolyte interfaces and has general implications for solid-state transport phenomena.

Although the invention has been described in considerable detail with reference to certain embodiments, one skilled in the art will appreciate that the present invention can be practiced by other than the described embodiments, which have been presented for purposes of illustration and not of limitation. Therefore, the scope of the appended claims should not be limited to the description of the embodiments contained herein. Various features and advantages of the invention are set forth in the following claims.

What is claimed is:

1. A method for forming an electrochemical device, the method comprising:
   (a) providing a precursor electrolyte having a resistive surface region formed on a surface of the precursor electrolyte, the resistive surface region comprising LiOH and/or Li$_2$CO$_3$; wherein the precursor electrolyte comprises a ceramic material having a formula of Li$_w$A$_x$M$_2$Re$_{3-y}$O$_z$ wherein w is 5 to 7.5, wherein A is selected from the group consisting of B, Al, Ga, In, Zn, Cd, Y, Sc, Mg, Ca, Sr, Ba, and any combination thereof, wherein x is 0 to 2, wherein M is selected from the group consisting of Zr, Hf, Nb, Ta, Mo, W, Sn, Ge, Si, Sb, Se, Te, and any combination thereof, wherein Re is selected from the group consisting of lanthanide elements, actinide elements, and any combination thereof, wherein y is 0.01 to 0.75, wherein z is 10.875 to 13.125, and wherein the material has a garnet-type or garnet-like crystal structure;
   (b) heating the precursor electrolyte to remove at least a portion of the resistive surface region thereby forming a solid state electrolyte; and
   (c) placing the solid state electrolyte in contact with an electrode.

2. The method of claim 1, wherein step (b) further comprises heating at a temperature between 180° C. to 1000° C.

3. The method of claim 2, wherein the resulting interfacial resistance between the electrode and the solid state electrolyte is less than 500 ohm cm$^2$.

4. The method of claim 1, wherein the electrode comprises an anode.

5. The method of claim 1, wherein step (c) further comprises depositing an interfacial layer on the solid state electrolyte, wherein the interfacial layer comprises a blocking metal, a semi-blocking metal, a non-blocking metal, or mixtures thereof.

6. A method for forming a solid state electrolyte, the method comprising:
   (a) providing a precursor electrolyte comprising an oxide of a metal, the precursor electrolyte having a resistive surface region formed on a surface of the precursor electrolyte, the resistive surface region comprising LiOH and/or Li$_2$CO$_3$; wherein the precursor electrolyte comprises a ceramic material having a formula of Li$_w$A$_x$M$_2$Re$_{3-y}$O$_z$ wherein w is 5 to 7.5, wherein A is selected from the group consisting of B, Al, Ga, In, Zn, Cd, Y, Sc, Mg, Ca, Sr, Ba, and any combination thereof, wherein x is 0 to 2, wherein M is selected from the group consisting of Zr, Hf, Nb, Ta, Mo, W, Sn, Ge, Si, Sb, Se, Te, and any combination thereof, wherein Re is selected from the group consisting of lanthanide elements, actinide elements, and any combination thereof, wherein y is 0.01 to 0.75, wherein z is 10.875 to 13.125, and wherein the material has a garnet-type or garnet-like crystal structure; and
   (b) heating the precursor electrolyte at a temperature above a melting point of the metal to remove at least a portion of the resistive surface region thereby forming a solid state electrolyte.

7. The method of claim 6, wherein step (b) further comprises heating at a temperature between 350° C. and 650° C.

8. The method of claim 6, wherein the resulting interfacial resistance between the electrode and the solid state electrolyte is less than 25 ohm cm$^2$.

9. The method of claim 6, wherein the electrode comprises an anode.

10. A method for forming a solid state electrolyte, the method comprising:
    (a) providing a precursor electrolyte having a resistive surface region formed on a surface of the precursor electrolyte, the resistive surface region comprising LiOH; wherein the precursor electrolyte comprises a ceramic material having a formula of Li$_w$A$_x$M$_2$Re$_{3-y}$O$_z$ wherein w is 5 to 7.5, wherein A is selected from the group consisting of B, Al, Ga, In, Zn, Cd, Y, Sc, Mg, Ca, Sr, Ba, and any combination thereof, wherein x is 0 to 2, wherein M is selected from the group consisting of Zr, Hf, Nb, Ta, Mo, W, Sn, Ge, Si, Sb, Se, Te, and any combination thereof, wherein Re is selected from the group consisting of lanthanide elements, actinide elements, and any combination thereof, wherein y is 0.01 to 0.75, wherein z is 10.875 to 13.125, and wherein the material has a garnet-type or garnet-like crystal structure; and
    (b) removing at least a portion of the resistive surface region thereby forming a solid state electrolyte,
    wherein removing at least a portion of the resistive surface region comprises a chemical treatment, electropolishing, wet polishing, argon plasma etching, oxygen plasma cleaning, annealing, or exposure to high vacuum.

11. The method of claim 10, wherein the resulting interfacial resistance between the electrode and the solid state electrolyte is less than 25 ohm cm$^2$.

12. The method of claim 10, wherein step (b) further comprises heating at a temperature between 400° C. to 600° C. under an inert gas atmosphere.

13. The method of claim 10, wherein the electrode comprises an anode, wherein the anode consists essentially of lithium metal.

14. A method for forming a solid state electrolyte, the method comprising:
    (a) providing a precursor electrolyte having a resistive surface region formed on a surface of the precursor electrolyte, the resistive surface region comprising LiOH; wherein the precursor electrolyte comprises a ceramic material having a formula of Li$_w$A$_x$M$_2$Re$_{3-y}$O$_z$ wherein w is 5 to 7.5, wherein A is selected from the group consisting of B, Al, Ga, In, Zn, Cd, Y, Sc, Mg, Ca, Sr, Ba, and any combination thereof, wherein x is 0 to 2, wherein M is selected from the group consisting of Zr, Hf, Nb, Ta, Mo, W, Sn, Ge, Si, Sb, Se, Te, and any combination thereof, wherein Re is selected from the group consisting of lanthanide elements, actinide elements, and any combination thereof, wherein y is 0.01 to 0.75, wherein z is 10.875 to 13.125, and wherein the material has a garnet-type or garnet-like crystal structure;

(b) removing at least a portion of the resistive surface region by polishing, and (c) heating the precursor electrolyte thereby forming a solid state electrolyte.

15. The method of claim 14, wherein the resulting interfacial resistance between the electrode and the solid state electrolyte is less than 100 ohm $cm^2$.

16. The method of claim 14, wherein step (b) comprises removing the portion of the resistive surface region by dry polishing.

17. The method of claim 14, wherein step (b) comprises removing the portion of the resistive surface region by wet polishing.

18. The method of claim 14, wherein step (c) comprises heating the precursor electrolyte in a temperature range of 200° C. to 500° C.

19. The method of claim 18, wherein the electrode is an anode consisting essentially of lithium metal.

20. An electrochemical device comprising:

a cathode;

a solid state electrolyte having a first surface and an opposite second surface; wherein the solid state electrolyte comprises a ceramic material having a formula of $Li_wA_xM_2Re_{3-y}O_z$ wherein w is 5 to 7.5, wherein A is selected from the group consisting of B, Al, Ga, In, Zn, Cd, Y, Sc, Mg, Ca, Sr, Ba, and any combination thereof, wherein x is 0 to 2, wherein M is selected from the group consisting of Zr, Hf, Nb, Ta, Mo, W, Sn, Ge, Si, Sb, Se, Te, and any combination thereof, wherein Re is selected from the group consisting of lanthanide elements, actinide elements, and any combination thereof, wherein y is 0.01 to 0.75, wherein z is 10.875 to 13.125, and wherein the material has a garnet-type or garnet-like crystal structure;

an anode comprising an electrochemically active metal, wherein an interfacial resistance between the anode and the solid state electrolyte is less than 500 ohm $cm^2$, wherein the first surface of the solid state electrolyte contacts the anode, and wherein the second surface of the solid state electrolyte contacts the cathode.

21. The electrochemical device of claim 20, wherein the electrochemically active metal comprises lithium, magnesium, sodium, or zinc.

22. The electrochemical device of claim 20, wherein the cathode comprises a lithium host material.

23. The electrochemical device of claim 22, wherein the lithium host material is selected from the group consisting of lithium metal oxides wherein the metal is one or more aluminum, cobalt, iron, manganese, nickel and vanadium, and lithium-containing phosphates having a general formula $LiMPO_4$ wherein M is one or more of cobalt, iron, manganese, and nickel.

* * * * *

UNITED STATES PATENT AND TRADEMARK OFFICE
CERTIFICATE OF CORRECTION

PATENT NO. : 10,938,061 B2  
APPLICATION NO. : 15/943312  
DATED : March 2, 2021  
INVENTOR(S) : Jeffrey Sakamoto et al.

Page 1 of 1

It is certified that error appears in the above-identified patent and that said Letters Patent is hereby corrected as shown below:

In the Specification

Column 8, Line 31, "$xH_2 \rightarrow$" should be -- $xH_2O \rightarrow$ --.

Signed and Sealed this  
Twentieth Day of April, 2021

Drew Hirshfeld  
*Performing the Functions and Duties of the*  
*Under Secretary of Commerce for Intellectual Property and*  
*Director of the United States Patent and Trademark Office*